(12) United States Patent
Kim

(10) Patent No.: US 10,202,101 B2
(45) Date of Patent: Feb. 12, 2019

(54) VEHICLE AND METHOD FOR CONTROLLING THE VEHICLE

(71) Applicant: HYUNDAI MOTOR COMPANY, Seoul (KR)

(72) Inventor: Sinjung Kim, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/132,982

(22) Filed: Apr. 19, 2016

(65) Prior Publication Data
US 2017/0190316 A1   Jul. 6, 2017

(30) Foreign Application Priority Data
Jan. 4, 2016   (KR) .......................... 10-2016-0000260

(51) Int. Cl.
*B60R 25/24* (2013.01)
*H04W 12/06* (2009.01)
*G07C 9/00* (2006.01)

(52) U.S. Cl.
CPC .......... *B60R 25/24* (2013.01); *G07C 9/00309* (2013.01); *H04W 12/06* (2013.01); *G07C 2009/00388* (2013.01); *G07C 2009/00396* (2013.01); *G07C 2009/00555* (2013.01)

(58) Field of Classification Search
None
See application file for complete search history.

(56) References Cited

U.S. PATENT DOCUMENTS

| 8,587,403 | B2* | 11/2013 | Ghabra | B60R 25/00 340/10.1 |
| 9,842,445 | B2* | 12/2017 | Lin | B60R 25/20 |
| 2002/0024460 | A1* | 2/2002 | Ghosh | B60R 25/24 342/43 |
| 2006/0044181 | A1* | 3/2006 | Wilcox | G01S 13/825 342/118 |
| 2009/0206989 | A1* | 8/2009 | Leitch | B60R 25/24 340/5.61 |

(Continued)

FOREIGN PATENT DOCUMENTS

| JP | 2006-319846 A | 11/2006 |
| JP | 2008-240315 A | 10/2008 |

(Continued)

OTHER PUBLICATIONS

Korean Notice of Allowance dated Mar. 2, 2017, issued in Korean Patent Application No. 10-2016-0000260. (w/ English translation).

*Primary Examiner* — Redhwan K Mawari
*Assistant Examiner* — Edward Torchinsky
(74) *Attorney, Agent, or Firm* — McDermott Will & Emery LLP

(57) ABSTRACT

A vehicle includes a communication unit for transmitting a Low Frequency (LF) signal including a test value to an external device, and for receiving a Radio Frequency (RF) signal including a verification value from the external device, a timer for determining a passage time from a point of time of transmission of the test value to a point of time of reception of the verification value, and a controller for authenticating the external device based on the passage time and whether the test value and the verification value correspond to each other.

16 Claims, 14 Drawing Sheets

(56) References Cited

U.S. PATENT DOCUMENTS

| | | | |
|---|---|---|---|
| 2016/0112846 A1* | 4/2016 | Siswick | H04B 17/27 |
| | | | 455/456.4 |
| 2016/0127473 A1* | 5/2016 | Khan | H04L 67/12 |
| | | | 455/66.1 |
| 2016/0200291 A1* | 7/2016 | Kim | B60R 25/30 |
| | | | 701/2 |
| 2016/0267735 A1* | 9/2016 | Hamada | G07C 9/00309 |
| 2016/0292941 A1* | 10/2016 | Miyazawa | G07C 9/00309 |
| 2016/0332597 A1* | 11/2016 | Tokunaga | B60R 25/24 |
| 2017/0004664 A1* | 1/2017 | Yamamoto | G07C 9/00309 |
| 2017/0008488 A1* | 1/2017 | Matsumoto | H04W 12/06 |
| 2017/0021801 A1* | 1/2017 | Yamamoto | B60R 25/01 |
| 2017/0076524 A1* | 3/2017 | Yoshihara | G07C 9/00309 |

FOREIGN PATENT DOCUMENTS

| | | |
|---|---|---|
| JP | 2011-122377 A | 6/2011 |
| JP | 2012-056343 A | 3/2012 |
| JP | 2012-144905 A | 8/2012 |
| JP | 2012-175518 A | 9/2012 |
| KR | 10-2012-0134607 A | 12/2012 |
| KR | 10-1340534 B1 | 12/2013 |

* cited by examiner

|     |       |          |          |          |          |      |          |
|-----|-------|----------|----------|----------|----------|------|----------|
| $C_1$ | $R_1$ | $R_{11}$ | $R_{12}$ | $R_{13}$ | $R_{14}$ | .... | $R_{1n}$ |
|     | $L_1$ | $L_{11}$ | $L_{12}$ | $L_{13}$ | $L_{14}$ | .... | $L_{1n}$ |
| $C_2$ | $R_2$ | $R_{21}$ | $R_{22}$ | $R_{23}$ | $R_{24}$ | .... | $R_{2n}$ |
|     | $L_2$ | $L_{21}$ | $L_{22}$ | $L_{23}$ | $L_{24}$ | .... | $L_{2n}$ |
| $C_i$ | $R_i$ | $R_{i1}$ | $R_{i2}$ | $R_{i3}$ | $R_{i4}$ | .... | $R_{in}$ |
|     | $L_i$ | $L_{i1}$ | $L_{i2}$ | $L_{i3}$ | $L_{i4}$ | .... | $L_{in}$ |

VEHICLE AND METHOD FOR CONTROLLING THE VEHICLE

CROSS-REFERENCE TO RELATED APPLICATION(S)

This application claims the benefit of priority, under 35 U.S.C. § 119(a), of a Korean patent application filed on Jan. 4, 2016 with the Korean Intellectual Property Office and assigned Serial No. 10-2016-0000260, the entire disclosure of which is incorporated hereby incorporated by reference.

TECHNICAL FIELD

The present disclosure relates to a vehicle and method for controlling the vehicle, which performs an authentication process with a smart key.

BACKGROUND

A smart key system allows a driver located outside of a vehicle to unlock, lock and start the vehicle without needing to insert a key into a key box of the vehicle or execute a particular manipulation. It further may utilize a smart key, such as an easy-to-carry smart card or a radio communication fob.

As the driver carrying the smart key approaches the vehicle, the vehicle can be automatically unlocked through Low Frequency (LF) communication and Radio Frequency (RF) communication with the smart key, and thus the driver can open the door and start the vehicle without a key insertion process.

Specifically, the smart key system for a vehicle performs i) transmitting an authentication request signal in a LF signal to the smart key, ii) receiving an authentication response in a RF signal from the smart key, and iii) determining whether authentication of the smart key that transmits the authentication response signal is completed. In this regard, due to the limit of transmission range of the LF signal, which has a relatively low frequency band compared to the RF signal, the vehicle can receive the authentication response signal from the smart key only if the smart key exists near the vehicle.

A relay located near the vehicle for gathering a LF signal transmitted from the vehicle through e.g., an antenna, and forwarding the LF signal to the smart key located distant from the vehicle, would enable the smart key to transmit an RF signal directly to the vehicle or enable gathering the RF signal through the antenna and forwarding the RF signal to the vehicle. However, such a process may cause hacking problems for the radio signals.

SUMMARY

The present disclosure provides a vehicle and method for controlling the same in a smart key system, which determines whether a radio signal is hacked by a relay based on LF and RF signal transmission and reception time between a vehicle and an external device, and prevents the hacking.

In accordance with an aspect of the present disclosure, a vehicle is provided. The vehicle includes a communication unit for transmitting a Low Frequency (LF) signal including a test value to an external device, and for receiving a Radio Frequency (RF) signal including a verification value from the external device; a timer for determining a passage time from a point of time of transmission of the test value to a point of time of reception of the verification value; and a controller for authenticating the external device based on the passage time and whether the test value and the verification value correspond to each other.

The communication unit may transmit the LF signal and receive the RF signal as many times as a predetermined threshold number.

The timer may determine a passage time from a first point of time of transmission of the test value to a last point of time of reception of the verification value.

The controller may determine that relay attack has occurred if the passage time is equal to or greater than a predetermined threshold time.

The communication unit may transmit information about a code corresponding to the test value in an LF signal.

The vehicle may further include a storage for storing one or more codes, and a test value and a verification value for each code.

The communication unit may include an LF communication unit for transmitting a scanning signal to an external device that exists within a possible range of LF signal transmission; and an RF communication unit for receiving a scanning response signal from the external device.

The LF communication unit may transmit an authentication request signal including the test value if the RF communication unit receives the scanning response signal, and the RF communication unit may receive an authentication response signal including the verification value.

The test value may include a plurality of test elements, and the verification value may include a plurality of verification elements.

In accordance with another aspect of the present disclosure, a method for controlling a vehicle is provided. The method includes transmitting a Low Frequency (LF) signal including a test value to an external device; receiving a Radio Frequency (RF) signal including a verification value from the external device; determining a passage time from a point of time of transmission of the test value to a point of time of reception of the verification value; and authenticating the external device based on the passage time and whether the test value and the verification value correspond to each other.

Transmitting an LF signal including a test value to an external device may include transmitting the LF signal as many times as a predetermined threshold number, and receiving an RF signal including a verification value from the external device may include receiving the RF signal as many times as the predetermined threshold number.

Determining a passage time from a point of time of transmission of the test value to a point of time of reception of the verification value may include determining a passage time from a first point of time of transmission of the test value to a last point of time of reception of the verification value.

Authenticating the external device based on the passage time and whether the test value and the verification value correspond to each other may include determining that relay attack has occurred if the passage time is equal to or greater than a predetermined threshold time.

The method may further include, before transmitting an LF signal including a test value to an external device, transmitting information about one of one or more codes stored in advance in a scanning signal; and receiving a scanning response signal corresponding to the scanning signal.

Transmitting an LF signal including a test value to an external device may include transmitting an authentication request signal including the test value if the scanning response signal is received, and receiving an RF signal including a verification value from the external device may include receiving an authentication response signal including the verification value.

The test value may include a plurality of test elements, and the verification value may include a plurality of verification elements.

Authenticating the external device based on the passage time and whether the test value and the verification value correspond to each other may include authenticating the external device based on whether a verification value corresponding to the test value stored in advance corresponds to the verification value included in the RF signal.

Authenticating the external device based on the passage time and whether the test value and the verification value correspond to each other may include authenticating the external device based on whether a verification element corresponding to each test element stored in advance corresponds to a verification element included in the RF signal.

Transmitting an LF signal including a test value to an external device may include starting a timer, and receiving an RF signal including a verification value from the external device may include stopping the timer.

Authenticating the external device based on the passage time and whether the test value and the verification value correspond to each other may include determining that relay attack has occurred if the test value does not correspond to the verification value.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other features and advantages of the present disclosure will become more apparent by describing in detail exemplary embodiments thereof with reference to the attached drawings in which:

FIG. 8 shows test and verification values corresponding to respective codes;

FIG. 10 is a detailed flowchart illustrating a step of preparation of a vehicle; FIG. 11 is a detailed flowchart illustrating a step of data comparison; and FIG. 12 is a detailed flowchart illustrating a step of determination of an accumulated error.

Throughout the drawings, like reference numerals will be understood to refer to like parts, components, and structures.

DETAILED DESCRIPTION

Figure 1:
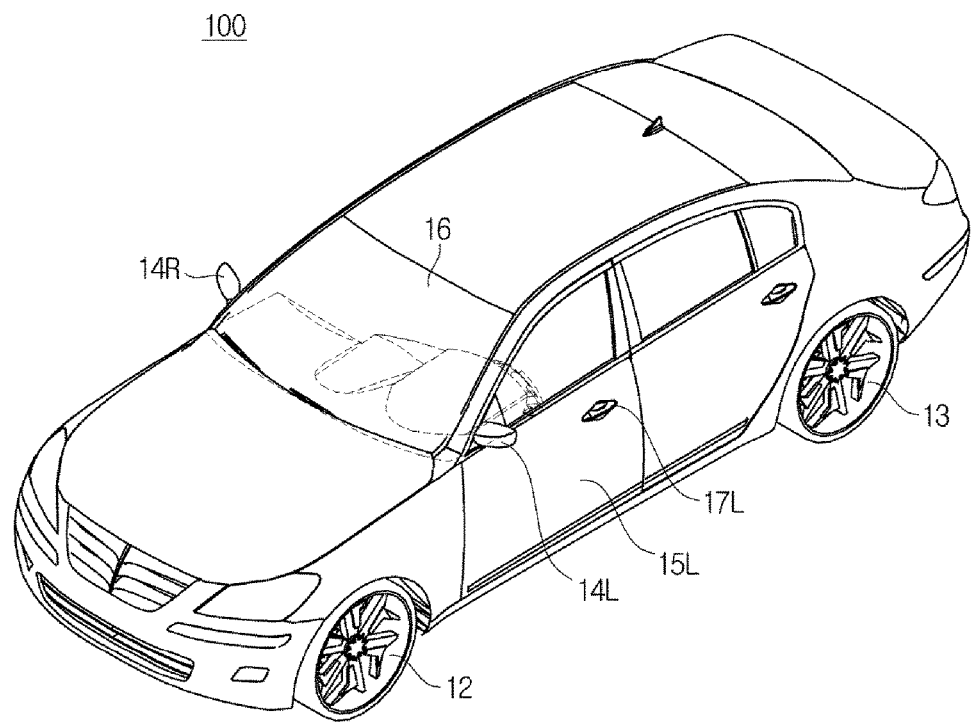
FIG. 1 is an exterior view of a vehicle, according to an embodiment of the present disclosure.

The present disclosure will now be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Like reference numerals in the drawings denote like elements, and thus their description will be omitted. In the description of the present disclosure, if it is determined that a detailed description of commonly-used technologies or structures related to the embodiments of the present disclosure may unnecessarily obscure the subject matter of the disclosure, the detailed description will be omitted. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Figure 2:
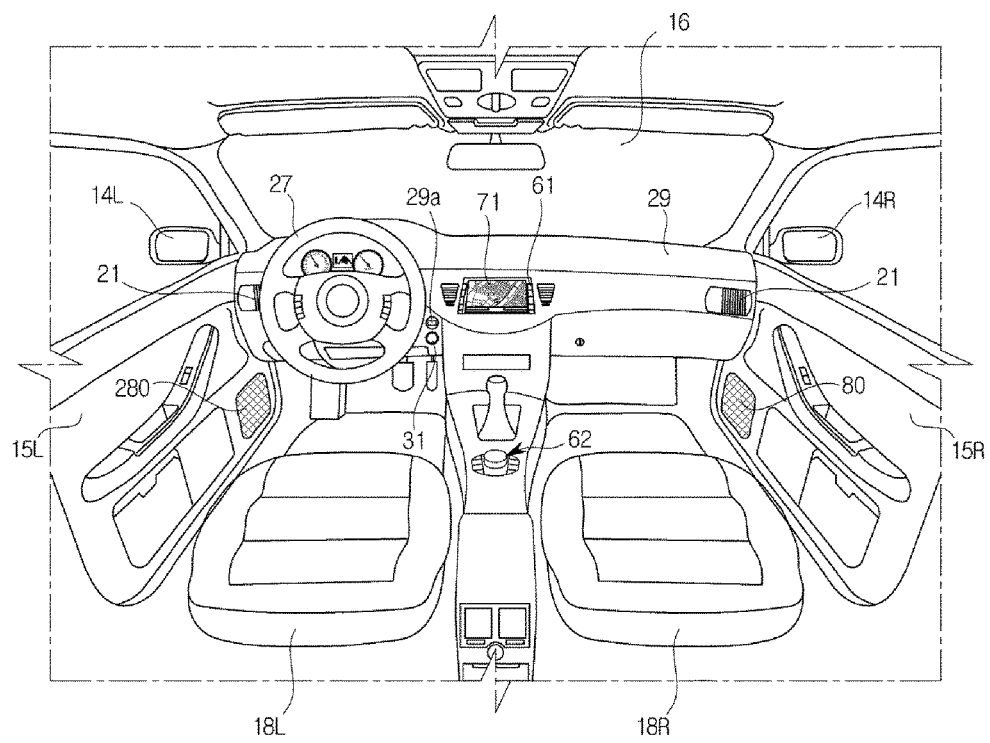
FIG. 2 shows internal features of a vehicle, according to an embodiment of the present disclosure.

FIG. 1 an exterior view of a vehicle, according to an embodiment of the present disclosure and FIG. 2 illustrates internal features of a vehicle, according to an embodiment of the present disclosure.

Referring to FIG. 1, the exterior of a vehicle 100 may include wheels 12 and 13 for moving the vehicle 100, doors 15L for shielding the interior of the vehicle 100 from the outside, a front window 16 through which the driver can see a view ahead of the vehicle 100, side mirrors 14L, 14R for helping the driver see areas behind, and to the sides of, the vehicle 100.

The wheels 12 and 13 include front wheels 12 and rear wheels 13, and a driving system (not shown) is arranged inside the vehicle 100 for providing a turning force to the front wheels 12 or rear wheels 13 to move the vehicle 10 forward or backward. The driving system may employ a motor that produces the turning force from electrical power supplied from a storage battery, or a combustion engine that burns a fuel to create the turning force.

The doors 15L and 15R (see FIG. 2) are attached onto the left and right sides of the vehicle 100 to be opened for a person to enter and exit the vehicle 100 and closed for shielding the interior of the vehicle 10 from the outside. In addition, there may be handles 17L mounted on the outer side of the vehicle 100 to open/close the doors 15L, 15R, and Low Frequency (LF) antennas (not shown) may be equipped in the respective handles 17L to transmit LF signals.

Once authentication is completed between a smart key (see FIG. 3) and the vehicle 100, the vehicle 100 may be unlocked and one of the doors 15L may be opened by the user pulling the handle 17L.

The front glass 16, also termed as a windshield glass, is placed on the top front of the main frame for securing a front view for the driver inside the vehicle 100.

The side mirrors 14L and 14R include the left side mirror 14L and the right side mirror 14R placed on the left and right sides of the vehicle 100, respectively, for helping the driver obtain views behind and to the sides of the vehicle 100.

In addition, the vehicle 100 may include detection devices, such as a proximity sensor for detecting an obstruction or other cars in the back or to the side of the vehicle 100, a rainfall sensor for detecting precipitation and whether it is raining, etc.

The proximity sensor may send out detection signals from the side or rear of the vehicle 100 and receive a reflection signal reflected from an obstruction or another vehicle. Based on the waveform of the received reflection signal, the vehicle 100 may determine whether there is another vehicle or obstruction behind and to the sides of the vehicle 100, and where the vehicle or obstruction is. For example, the proximity sensor may detect a distance to the obstruction (including various obstacles and other cars) by irradiating ultrasounds or infrared rays and receiving the reflected ultrasounds or infrared rays from the obstacles.

Referring to FIG. 2, in the center area of a dashboard 29, there may be an Audio Video Navigation (AVN) display 71 and an AVN input unit 61. The AVN display 71 may selectively display at least one of audio, video, and navigation screens, and in addition, display various control screens related to the vehicle 100 or screens related to additional functions.

The AVN display 71 may be implemented with Liquid Crystal Displays (LCDs), Light Emitting Diodes (LEDs), Plasma Display Panels (PDPs), Organic Light Emitting Diodes (OLEDs), Cathode Ray Tubes (CRTs), or the like.

The AVN input unit 61 may be implemented as a hard key type in an area close to the AVN display 71, or implemented in the form of a touch panel on the front face of the AVN display 71 if the AVN display 71 is implemented in a touch screen type.

Furthermore, a center input unit 62 of a jog shuttle type may be mounted between a driver seat 18L and a passenger seat 18R. The user may input a control command by turning or pressing the center input unit 62 or pushing the center input unit 62 to left, right, up or down.

The vehicle 100 may also be equipped with a sound output unit 80 for outputting sound, which may be a speaker. The sound output unit 80 may output sound from audio, video, navigation, and other additional functions.

A steering wheel 27 may be mounted on the dashboard 29 in front of the driver seat 18L, and a key hole 29a may be formed near the steering wheel 27 for a smart key 200, also referred to as a fob key (see FIG. 3) to be inserted thereto. Once the smart key 200 is inserted into the key hole 29a or authentication is completed between the smart key 200 and the vehicle 100 over a wireless communication network, the vehicle 100 may be connected to the smart key 200.

Furthermore, there may be a start button 31 located on the dashboard 29 to start/stop the engine of the vehicle 100. When the smart key 200 is inserted into the key hole 29a or authentication is successfully completed between the smart key 200 and the vehicle 100 over a wireless communication network, the engine of the vehicle 100 may be started by pressure of the user onto the start button 31.

The vehicle 100 may also include an air conditioner to perform heating or cooling and release the heated or cooled air through vents 21 to control the temperature inside the vehicle 100.

Figure 3:
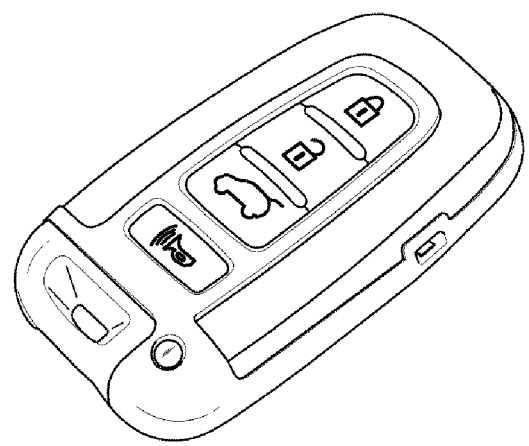
FIG. 3 shows a smart key, according to an embodiment of the present disclosure.

FIG. 3 shows a smart key according to an embodiment of the present disclosure.

The smart key 200 may be connected to the vehicle 100 through exchange of wired or wireless signals.

Referring to FIG. 3, for example, the smart key 200 may be a fob key connected to the vehicle 100 via cable or wirelessly to unlock a vehicle door, or start the engine to drive the vehicle 100.

In the embodiment of FIG. 3, the smart key 200 is not limited to the fob key, but may correspond to any input device that may control the vehicle 100 to unlock the doors or start the engine to drive the vehicle 100. For example, if a mobile device is able to serve as a smart key, the smart key 200 in the embodiment of the present disclosure may include the mobile device. For this, an application to execute an operation as the smart key 200 may be installed in the mobile device, in which case the application may be installed before being released or downloaded from a server after being released. Furthermore, the mobile device may go through an authentication process to operate as the smart key 200 for the vehicle 100.

The smart key 200 may be released together with the vehicle 100, and may store authentication information in advance for being connected to the vehicle 100.

The smart key 200 and the vehicle 100 may mutually exchange signals over LF and RF communication networks in order to perform the mutual authentication process.

The LF communication network may be a communication network having a low frequency band, e.g., from about 20 kHz to about 135 kHz used by the vehicle 100 to transmit LF signals to scan or authenticate the smart key 200. In the case of exchanging LF signals over the LF communication network, due to the properties from the low frequency band, a possible range of signal transmission and reception may be short as compared with that of the RF communication network having a high frequency band. For example, a possible range of LF signal transmission and reception may be about 5 m, while the possible range of RF signal transmission and reception may be about 100 m.

Accordingly, the vehicle 100 may be able to scan the smart key 200 approaching the vehicle 100 or request information required for authentication of the scanned smart key 200 by transmitting LF signals over the LF communication network.

The RF communication network may be a communication network having a high frequency band, e.g., from about 315 MHz to about 433 MHz used by the vehicle 100 to receive RF signals as scanning or authentication response signals from the smart key 200 that receives the LF signals. In the case of exchanging RF signals over the RF communication network, a possible range of signal transmission and reception may be long as compared with that of the LF communication network having a low frequency band. Accordingly, when the smart key 200 transmits a scanning response signal in response to the received scanning signal, the vehicle 100 may receive the scanning response signal through the RF communication network; when the smart key 200 transmits an authentication response signal in response to the received authentication request signal, the vehicle 100 may receive the authentication response signal.

The LF signal include a scanning signal to scan the smart key 200 around the vehicle 100 (i.e., within a possible range of LF signal transmission and reception), and an authentication request signal to request authentication information to perform an authentication process with the scanned smart key 200.

The RF signal may include a scanning response signal generated by the smart key 200 as a response signal to the scanning signal, and an authentication response signal including authentication information requested by the vehicle 100.

Figure 4:
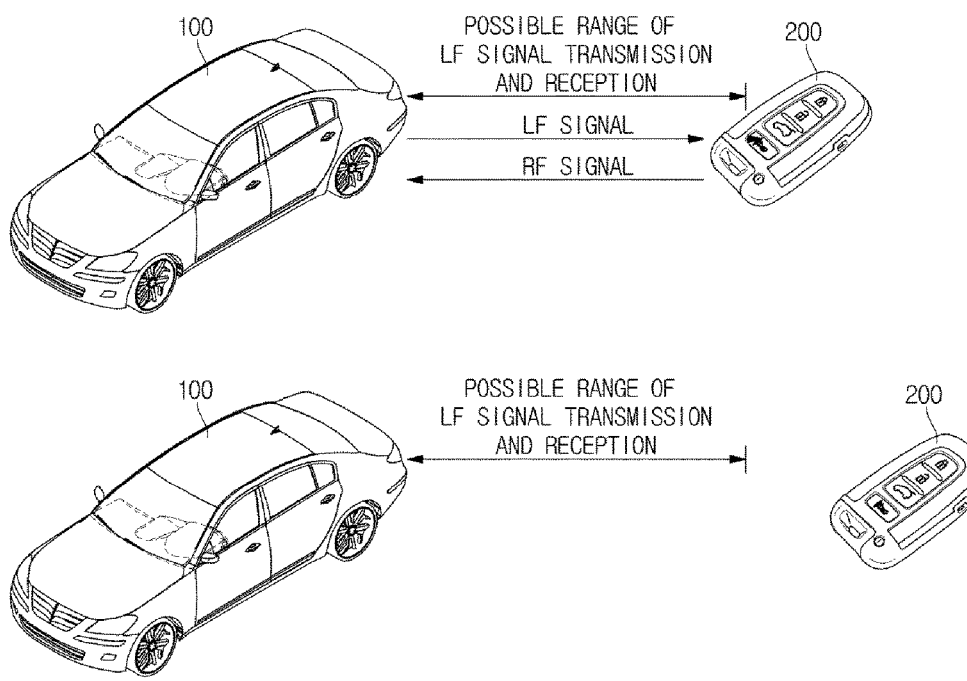
FIGS. 4, 5A, and 5B are diagrams for explaining an authentication process between a vehicle and a smart key, which is performed within a possible range of transmission and reception of various signals.
Figure 5A:
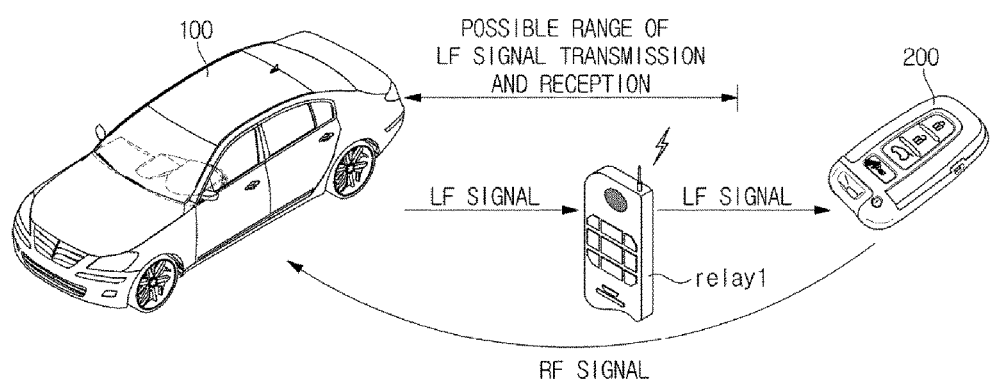
Figure 5B:
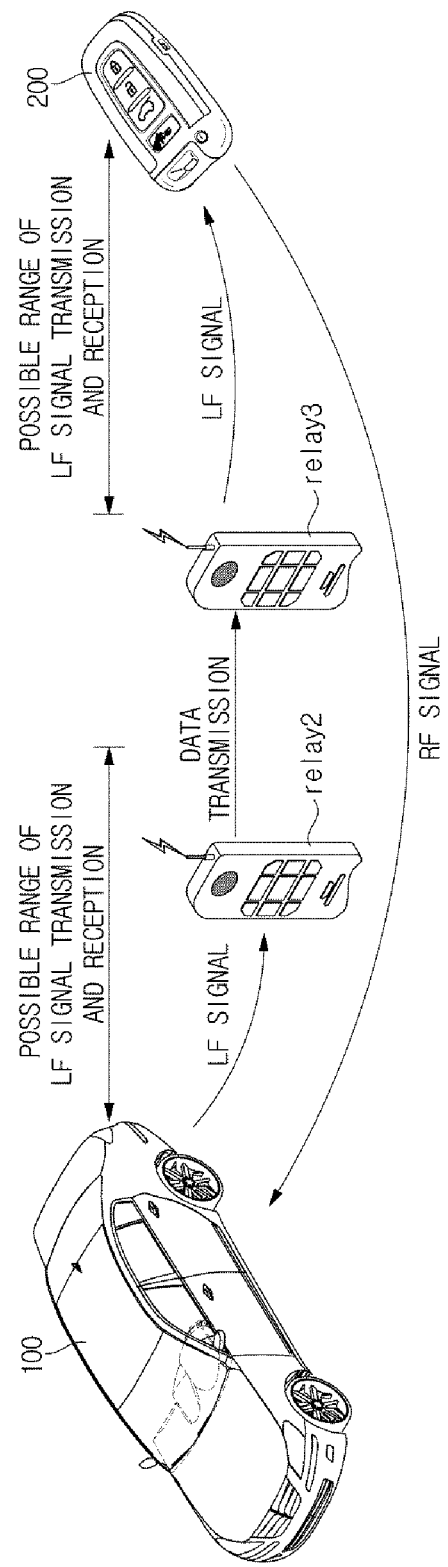

FIGS. 4, 5A, and 5B are diagrams for explaining an authentication process between a vehicle and a smart key, which may be performed within a possible range of transmission and reception of various signals.

Referring to FIG. 4, if the smart key 200 exists within the possible range of LF signal transmission and reception from the vehicle 100, the smart key 200 may receive an LF signal from the vehicle 100 over the LF communication network and transmit an RF signal to the vehicle 100 over the RF communication network.

Otherwise, if the smart key 200 does not exist within the possible range of LF signal transmission and reception from the vehicle 100, the smart key 200 may not be able to receive an LF signal even if the vehicle 100 transmits the LF signal through the LF communication network. Accordingly, the smart key 200 transmits no RF signal to the vehicle 100.

Referring to FIG. 5A, however, even if the smart key 200 does not exist within the possible range of LF signal transmission and reception, if a first relay (or relay 1) attempts hacking into the process of LF signal transmission between the vehicle 100 and the smart key 200, the LF signal transmitted from the vehicle 100 may be transmitted to the smart key 200 via the relay 1 located within the possible range of LF signal transmission from the vehicle 100 and within the possible range of LF signal reception from the smart key 200.

Furthermore, referring to FIG. 5B, even if the relay does not exist within the possible range of LF signal transmission and reception from the smart key 200, there may be a second relay (or relay 2) located within the possible range of LF signal transmission from the vehicle 100 and a third relay (or relay 3) located within the possible range of LF signal reception from the smart key 200, and the relay 2 may forward the LF signal transmitted from the vehicle 100 to the relay 3, which may in turn forward the LF signal to the smart key 200. That is, the LF signal from the vehicle 100 may be delivered to the smart key 200 located at a long distance. The smart key 200 located within the possible range of RF signal reception of the vehicle 100 may then transmit an RF signal to the vehicle 100 and thus the authentication process may be abnormally completed.

Moreover, although not shown, even if the smart key 200 does not exist within the possible range of RF signal reception from the vehicle 100, a relay located within the possible range of RF signal transmission and reception from the vehicle 100 and the smart key 200 may deliver the RF signal from the smart key 200 to the vehicle 100, thereby abnormally completing the authentication process.

Figure 6A:
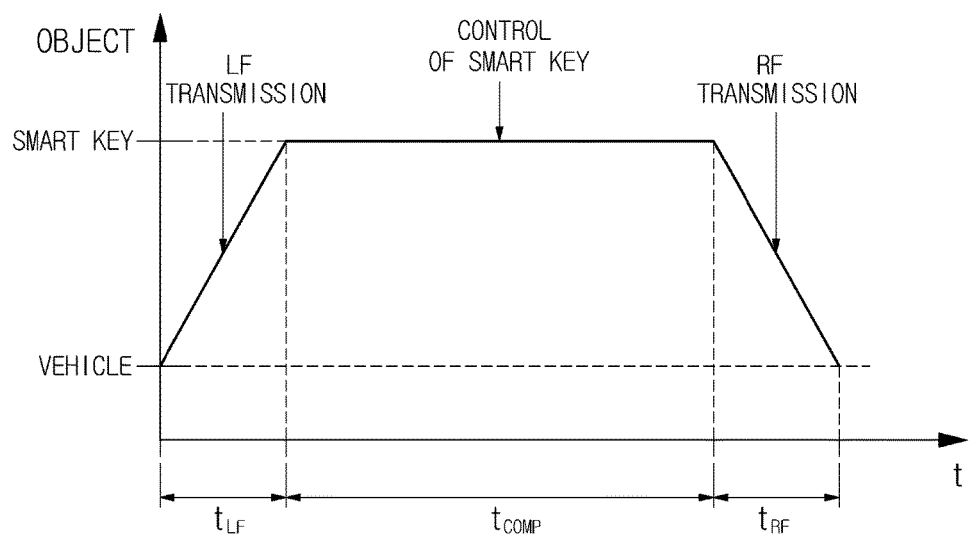
FIGS. 6a and 6b shows respective graphs for comparing a normal authentication process and an abnormal authentication process over the passage of time.
Figure 6B:
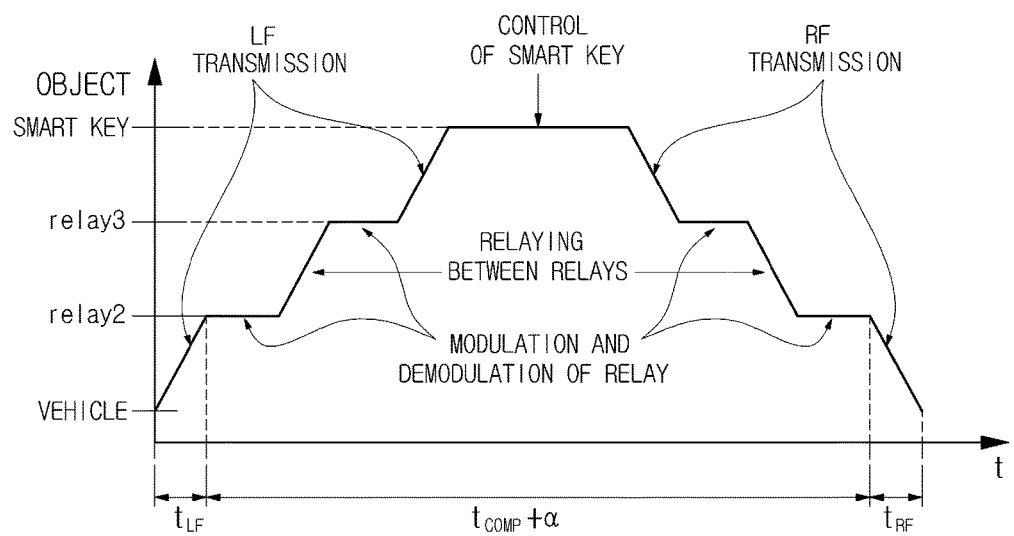

FIGS. 6a and 6b shows respective graphs for comparing a normal authentication process and an abnormal authentication process over the passage of time.

Referring to FIG. 6a, in a normal authentication process, the vehicle 100 may transmit an LF signal directly to the smart key 200, and the smart key 200 may perform a control process in response to the received LF signal and transmit an RF signal corresponding to the LF signal directly to the vehicle 100.

If the time taken to transmit an LF signal from the vehicle 100 to the smart key 200 is denoted $t_{LF}$, the time taken to perform a control process in response to the received LF signal in the smart key 200 is denoted $t_{COMP}$, and the time taken to transmit an RF signal from the smart key 200 to the vehicle 100 is denoted $t_{RF}$, authentication passage time $t_{TOTAL}$ amounts to the sum of $t_{LF}$, $t_{COMP}$, and $t_{RF}$, i.e., $t_{TOTAL}=t_{LF}+t_{COMP}+t_{RF}$.

However, in an abnormal authentication process, as seen in FIG. 6b, a relay may modulate or demodulate an LF signal transmitted from the vehicle 100 and transmit the modulated or demodulated LF signal to the smart key 200, and modulate or demodulate an RF signal transmitted from the smart key 200 and transmit the modulated or demodulated RF signal to the vehicle 100, thereby adding the modulation and demodulation time a of the rely to the normal authentication passage time. Accordingly, the authentication passage time $t_{TOTAL}$ in the abnormal authentication process amounts to the sum of $t_{LF}$, $t_{COMP}$, $t_{RF}$, and a, i.e., $t_{TOTAL}=t_{LF}+t_{COMP}+t_{RF}+\alpha$.

If the modulation and demodulation time a is very short, there is little difference in the authentication passage time $t_{TOTAL}$ between the normal authentication process and the abnormal authentication process, measured for an authentication request and an authentication response.

Accordingly, in an embodiment, the vehicle 100 may measure an accumulated passage time $N*t_{TOTAL}$ by repeatedly transmitting the authentication request signal and receiving authentication response signal to determine whether a relay has been involved in the authentication process between the vehicle 100 and the smart key 200, i.e., whether there has been relay attack, and may determine whether there has been the relay attack based on the accumulated passage time. Detailed features of the vehicle 100 and method for controlling the vehicle 100 will now be described.

Figure 7:
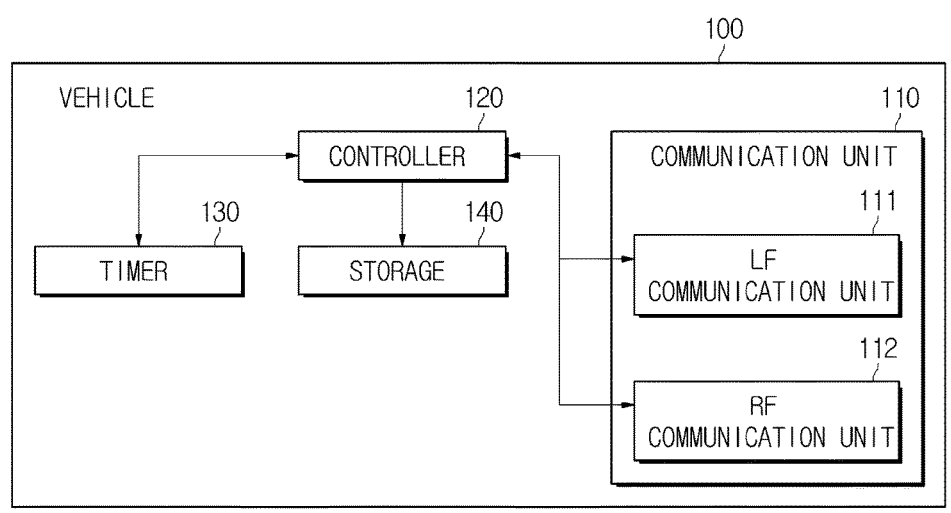
FIG. 7 is a control block diagram of a vehicle, according to an embodiment of the present disclosure.

FIG. 7 is a control block diagram of a vehicle according to an embodiment of the present disclosure.

Referring to FIG. 7, the vehicle 100 may include a communication unit 110 for exchanging signals with the smart key 200, a controller 120 for controlling an operation of the components of the vehicle 100, a timer 130 for measuring time and a storage 140 for storing data.

The communication unit 110 of the vehicle 100 may include an LF communication unit 111 for transmitting LF signals within the possible range of LF signal transmission over the LF communication network, and an RF communication unit 112 for receiving RF signals within the possible range of RF signal reception over the RF communication network.

The LF communication unit 111 may transmit a scanning signal to discover the nearby smart key 200 over the LF communication network, and may transmit an authentication request signal including a test value stored in the storage 140 to the smart key 200 according to a control signal from the controller 120 if the RF communication unit 112 receives a scanning response signal.

The LF communication unit 111 may include an LF communication interface having a communication port for connecting the controller 120 to the LF communication network and a transmitter for transmitting LF signals.

Furthermore, the LF communication unit 111 may further include an LF signal transform module for modulating a digital control signal output from the controller 120 through the LF communication interface to an analog LF signal under the control of the controller 120.

The RF communication unit 112 may receive a scanning response signal and an authentication response signal including a verification value over the RF communication network. The test value and verification value will be further described later.

The RF communication unit 112 may include an RF communication interface having a communication port for connecting the controller 120 to the RF communication network and a receiver for receiving RF signals.

The RF communication unit 112 may further include an RF signal transform module for demodulating an analog RF signal received through the RF communication interface to a digital control signal.

The RF signals, LF signals, and control signals of the vehicle 100 may have different formats.

The controller 120 may control the respective components included in the vehicle 100.

In an embodiment, the controller 120 may generate a scanning signal including information about any code among one or more codes stored in advance and mutually shared with the normally authenticated smart key 200, and transmit the scanning signal through the LF communication unit 111.

The vehicle 100 may store one or more codes mutually shared with the smart key 200 in the storage 140 in advance.

If the RF communication unit 112 receives a scanning response signal, the controller 120 starts the timer 130 and transmits a test value corresponding to the transmitted code as an authentication request signal. In this case, the authentication request signal is transmitted through the LF communication unit 111.

Upon reception of an authentication response signal through the RF communication unit 112, the controller 120 may determine whether the authentication response signal includes a verification value and determines that a relay attack has occurred if there is no verification value.

On the other hand, if there is the verification value, the controller 120 may determine how many times the verification number has been received, and if the number of times the verification value has been received is less than a predetermined threshold, may repeat the process of transmitting the test value and receiving the verification value. On the other hand, if the number of times the verification has been received is equal to or greater than the predetermined threshold, the controller 120 may stop the timer 130 and record the time detected from the timer 130 in the storage 140. In other words, the controller 120 may repeat a process of transmitting the authentication request signal including the test value and receiving the authentication response signal including the verification value as many times as the predetermined threshold number, and record the passage time from when the first authentication request signal has been transmitted to when the last authentication response signal has been received in the storage 140.

Subsequently, the controller 120 may determine whether a plurality of verification values received in response to the respective transmission of the test value correspond to the transmitted code. If even one of the plurality of verification values does not correspond to the transmitted code, the controller 120 may determine that a relay attack has occurred.

Furthermore, even if the plurality of verification values all correspond to the transmitted code, the controller 120 may determine whether the passage time detected from the timer 130 is less than a predetermined threshold time.

If the passage time detected from the timer 130 is less than the predetermined threshold time, the controller 120 may determine that authentication is completed. If the passage time detected from the timer 130 is not less than the predetermined threshold time, the controller 120 may determine that relay attack has occurred.

An operation procedure of the controller 120 will be described below in detail.

The controller 120 may include a processor for generating control signals according to the program and data stored in the storage 140.

The timer 130 may determine the passage time according to a control signal of the controller 120. The timer 130 may determine the passage time based on the current time provided on the AVN display 71.

The timer 130 may determine a point of time when the first test value is transmitted and a point of time when the number of times the verification value has been received corresponds to the predetermined threshold number, i.e., a point of time when the last verification value is received. The timer 130 may then record the passage time from the point of time of transmission of the test value to the point of time when the number of times the verification value has been received corresponds to the predetermined threshold number.

The storage 140 may store one or more codes mutually shared between the vehicle 100 and the normally authenticated smart key 200. There may be a corresponding test value and verification value for each code.

For example, the storage 140 may store a test value and verification value corresponding to each code as a sequence. FIG. 8 shows test and verification values corresponding to respective codes.

Referring to FIG. 8, the storage 140 may store test value L1 and verification value R1 for code C1; test value L2 and verification value R2 for code C2; and test value Li and verification value Ri for code Ci.

Information about the test and verification values for C1 to Ci may be mutually shared with the normally authenticated smart key 200.

A test value may be represented as a test sequence including a plurality of test elements, and a verification value may be represented as a verification sequence including a plurality of verification elements. For example, test value Li may include test elements Li1, Li2, . . . , Lin, and verification value Ri may include verification elements Ri1, Ri2, . . . , Rin.

The storage 140 may include a memory for storing a program and data to control the components of the vehicle 100.

In some embodiments, the storage 140 and the controller 120 may be implemented with a separate memory device and processor, or in a single device.

Figure 9:
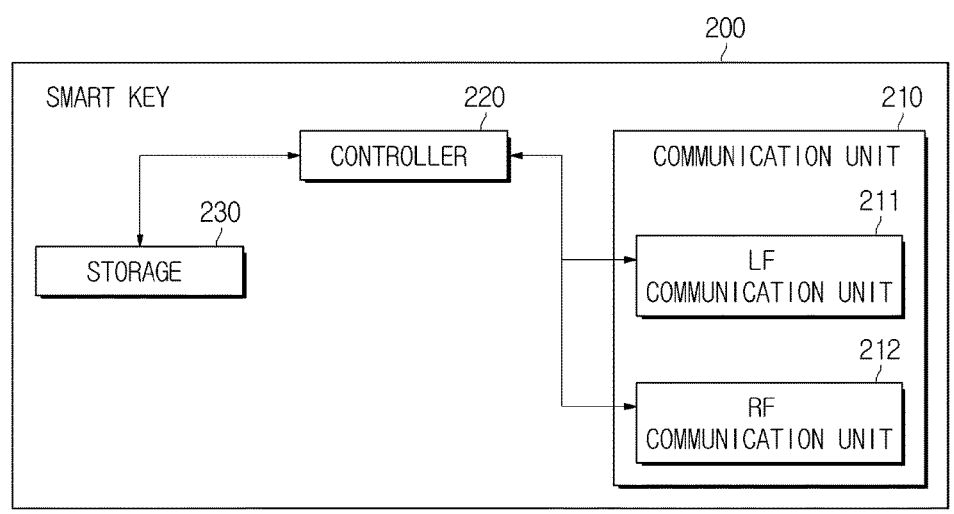
FIG. 9 is a control block diagram of a smart key, according to an embodiment of the present disclosure.

FIG. 9 is a control block diagram of a smart key according to an embodiment of the present disclosure.

Referring to FIG. 9, the smart key 200 may include a communication unit 210 for exchanging signals with the vehicle 100, a controller 220 for controlling operation of the components of the smart key 200 and a storage 230 for storing data.

The communication unit 210 of the smart key 200 may include an LF communication unit 211 for receiving LF signals within a possible range of LF signal reception over the LF communication network, and an RF communication unit 212 for transmitting RF signals within a possible range of RF signal transmission over the RF communication network.

The LF communication unit 211 may receive a scanning signal and an authentication request signal over the LF communication network.

The LF communication unit 211 may include an LF communication interface having a communication port for connecting the controller 220 of the smart key 200 to the LF communication network and a receiver for receiving LF signals.

The LF communication unit 211 may further include an LF signal transform module for demodulating an analog LF signal received through the LF communication interface to a digital control signal.

The RF communication unit 212 may transmit a scanning response signal corresponding to the scanning request signal over the RF communication network, and if receiving the authentication request signal including a test value, may transmit an authentication response signal including a verification value corresponding to the received test value. The test value and verification value will be further described below.

Furthermore, the RF communication unit 212 may further include an RF signal transform module for modulating a digital control signal output from the controller 220 through the RF communication interface to an analog RF signal under the control of the controller 220.

The RF signals, LF signals, and control signals of the smart key 200 may have different formats.

The controller 220 may control the respective components included in the smart key 200.

In an embodiment, upon reception of the scanning signal from the vehicle 100, the controller 220 may fetch a test value and verification value from the storage 230 for a code included in the scanning signal. The controller 220 may receive an authentication request signal from the vehicle 100, and compare a test value included in the authentication request signal and the test value fetched from the storage 230.

The controller 220 may control the RF communication unit 212 to transmit an authentication response signal to the vehicle 100, the authentication response signal including the verification value fetched from the storage 230. In this regard, the controller 220 may transmit the authentication response signal to the vehicle 100 if the test value included in the authentication request signal corresponds to the test value fetched from the storage 230.

The controller 220 may include a processor for generating control signals according to the program and data stored in the storage 230.

The storage 230 may store one or more codes mutually shared between the smart key 200 and the vehicle 100. Each code may include a corresponding test value and verification value.

For example, the storage 230 may store a test value and verification value as a sequence for each code. The test value and verification value represented in a sequence have the same format as described above in connection with FIG. 8, so the overlapping description will be omitted herein.

For example, if the scanning signal includes information about code C2, the controller 220 may fetch corresponding verification value R2 from the storage 230 for the code C2. The controller 220 may then determine whether the authentication request signal transmitted from the vehicle 100 includes test value L2, and if the authentication request signal includes test value L2, may transmit an authentication response signal including the verification value R2 to the vehicle 100.

In some embodiments, the storage 230 and the controller 220 may be implemented with a separate memory device and processor, or in a single device.

An embodiment of an authentication process between the vehicle 100 and the smart key 200 will now be described in detail with reference to FIGS. 10 to 12. Components of the vehicle 100 and smart key 200 of FIGS. 10 to 12 are identical to those of the vehicle 100 and smart key 200 of FIGS. 1 to 9, so the same reference numerals will be used for explanation.

Figure 10:
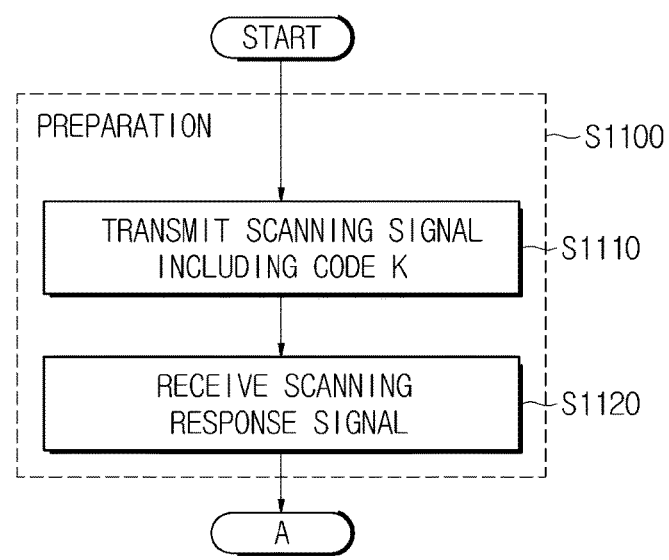
FIGS. 10 to 12 are flowcharts illustrating a method for controlling a vehicle, according to an embodiment of the present disclosure.
Figure 11:
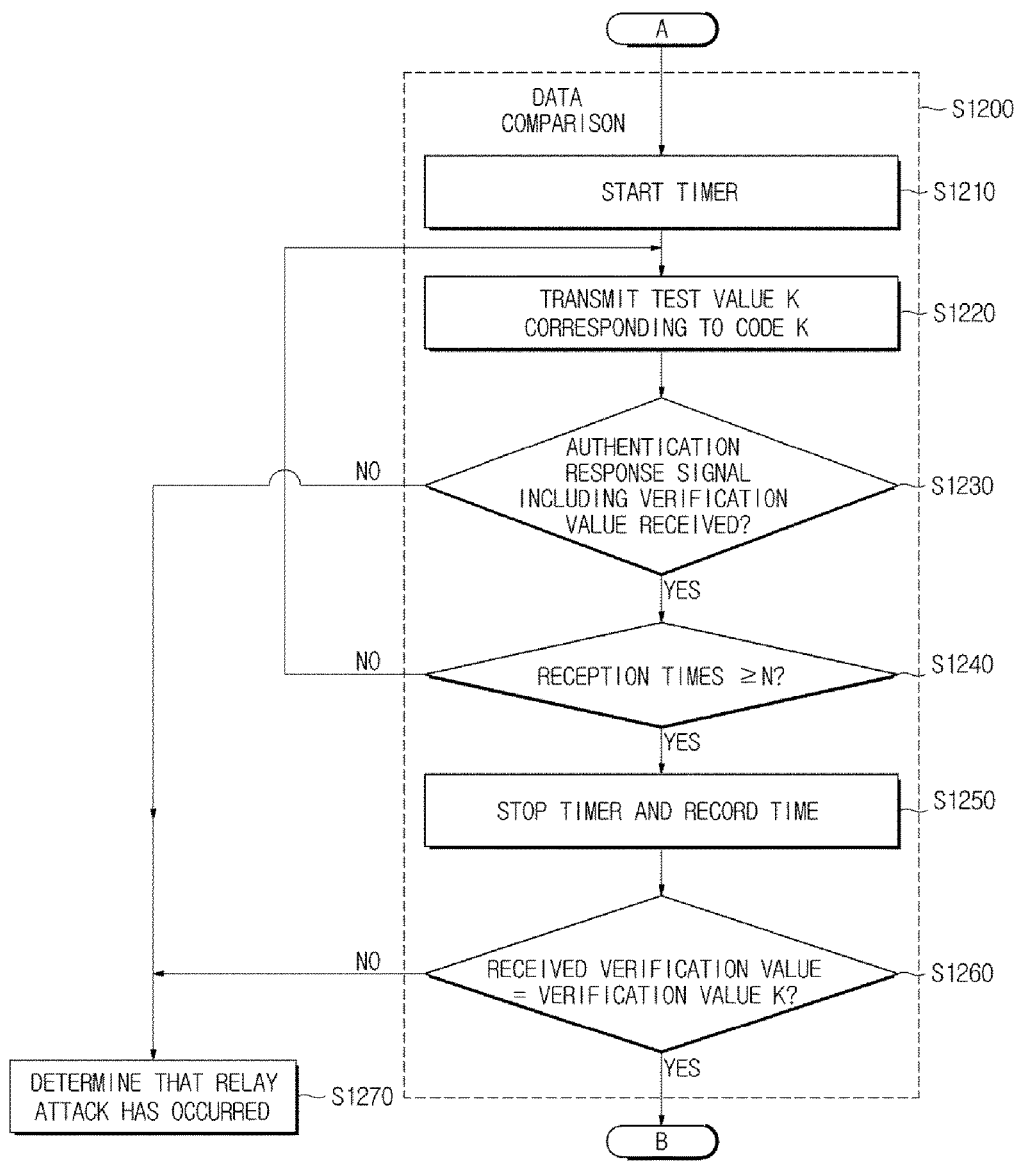
Figure 12:
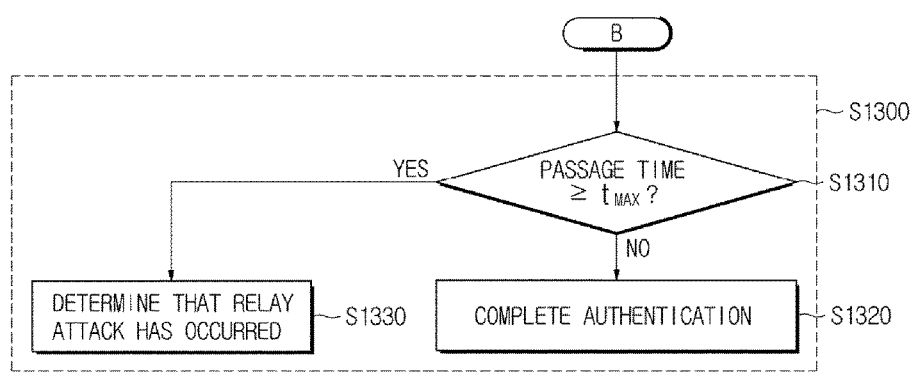

FIGS. 10 to 12 are flowcharts illustrating a method for controlling a vehicle according to an embodiment of the present disclosure. FIG. 10 is a detailed flowchart illustrating a step of preparation of a vehicle; FIG. 11 is a detailed flowchart illustrating a step of data comparison; and FIG. 12 is a detailed flowchart illustrating a step of determination of an accumulated error.

A method for controlling the vehicle 100 in accordance with an embodiment of the present disclosure may include steps of i) preparing authentication, ii) comparing verification values and, iii) determining an accumulated error during authentication passage time.

Referring to FIG. 10, i) preparing authentication in step S1100 may include transmitting a scanning signal to scan the smart key 200 around the vehicle 100, in step S1110, and receiving a scanning response signal, in step S1120.

Specifically, transmitting a scanning signal in step S1110 may include transmitting a scanning signal including information about a code mutually shared between the storage 140 of the vehicle 100 and the storage 230 of the normally authenticated smart key 200.

Transmitting a scanning signal in step S1110 may include the LF communication unit 111 of the vehicle 100 scattering information about any code Ck among one or more codes stored in the storage 140 within a possible range of LF signal transmission.

In this regard, if the smart key 200 exists within the possible range of LF signal transmission, the LF communication unit 211 of the smart key 200 may receive the scanning signal, and the controller 220 of the smart key 200 may extract the information about the code Ck included in the scanning signal, i.e., extracts test value Lk and verification value Rk from the storage 230 for the code. The RF communication unit 212 of the smart key 200 may then transmit a scanning response signal to the vehicle 100.

Receiving a scanning response signal in step S1120 may include the RF communication unit 112 of the vehicle 100 receiving the scanning response signal if the vehicle 100 is within a possible range of RF signal reception from the smart key 200.

Referring to FIG. 11, ii) comparing test and verification values in step S1200 may include starting the timer 130 in step S1210 if the RF communication unit 112 of the vehicle 100 receives the scanning response signal, transmitting a test value Lk to the smart key 200, the test value Lk corresponding to the code Ck transmitted to the smart key 200, in step S1220, determining whether a verification value is included in a received authentication response signal in step S1230, if the verification value is included, determining the number of times the verification value has been received in step S1240, if the number of times the verification value has been received is equal to or greater than a predetermined threshold number N, stopping the timer 130 and recording the passage time in step S1250, and determining whether the verification value received from the smart key 200 corresponds to the verification value corresponding to the code Ck in step S1260.

Specifically, starting the timer 130 in step S1210 includes the timer 130 recording a point of time when a first authentication request signal is transmitted. In other words, the timer 130 may record a point of time of first transmission of the authentication request signal.

Transmitting a test value Lk to the smart key 200 in step S1220 includes, if the test value Lk is a sequence, transmitting test elements Lk1, Lk2, . . . Lkn included in the sequence of the test value Lk.

Transmitting a test value Lk to the smart key 200 in step S1220 includes the LF communication unit 111 transmitting an authentication request signal including the test value Lk within a possible range of LF signal transmission.

However, if the vehicle 100 previously transmitted a scanning signal including information about any code Ck to the smart key 200, the vehicle 100 may transmit an authentication request signal without including the test value Lk because the smart key 200 already obtained the information about the code Ck. In this case, the smart key 200 may extract a verification value Rk from the storage 230 corresponding to the code Ck received from the vehicle 100.

If the vehicle 100 previously transmitted a scanning signal to the smart key 200 without information about the code Ck, the vehicle 100 may transmit an authentication request signal including the test value Lk for authentication because the smart key 200 has not obtained any information about the code Ck, and the smart key 200 may then extract the verification value Rk from the storage 230 corresponding to the test value Lk received from the vehicle 100.

The RF communication unit 212 of the smart key 200 may then transmit a scanning response signal including the extracted verification value Rk to the vehicle 100.

The RF communication unit 112 of the vehicle 100 may receive an authentication response signal from the smart key 200, if the smart key 200 exists within the possible range of RF signal reception.

Upon reception of the authentication response signal, the controller 120 of the vehicle 100 may then determine whether the authentication response signal includes the verification value Rk, in step S1230.

If the verification value Rk is not included, the controller 120 may determine that relay attack has occurred and stop the authentication process in step S1270. If the verification value Rk is included, the controller 120 may repeatedly transmit the authentication request signal and receive the authentication response signal including the verification value until the verification value Rk has been received as many times as the predetermined threshold number N or more, in step S1240.

Repeatedly transmitting the authentication request signal may include transmitting first to N'th authentication request signals and repeatedly receiving the authentication response signal includes receiving first to N'th authentication response signals.

If the verification value or the authentication response signal has been received as many times as the predetermined threshold number N or more, the controller 120 of the vehicle 100 stops the timer 130 and records the passage time from when the timer 130 starts measurement to when the timer 130 stops the measurement, in step S1250.

Stopping the timer 130 in step S1250 may include the timer 130 recording a point of time when the Nth authentication request signal is received. In other words, the timer 130 may record the last point of time of reception of the authentication response signal.

The timer 130 recording the passage time in step S1250 may include the timer 130 recording the passage time from the point of time of transmission of the first authentication request signal to the point of time of reception of the N'th authentication response signal.

Next, the controller 120 of the vehicle 100 may determine whether the verification value Rk received from the smart key 200 corresponds to the verification value corresponding to the code Ck included in the scanning signal, in step S1260.

If the verification values correspond to each other, the controller 120 of the vehicle 100 performs iii) determining an accumulated error during the authentication passage time in step S1300, or otherwise if the verification values do not correspond, the controller 120 determines that a relay attack has occurred and stops the authentication process in step S1270.

Determining whether the verification values correspond in step S1260 may include determining whether the test values included in the first to Nth authentication response signals all correspond to the verification value corresponding to the code Ck included in the scanning signal. If at least one of the first to Nth authentication response signals is different from the verification value corresponding to the code Ck included in the scanning signal, it may be determined that relay attack has occurred.

Furthermore, determining whether the verification values correspond in step S1260 may include, if the test value and the verification value are sequences, determining whether verification elements included in the authentication response signal all correspond to the verification elements of the verification value corresponding to the code Ck included in the scanning signal. If even one of the verification elements does not match, it may be determined that relay attack has occurred.

Referring to FIG. 12, iii) determining an accumulated error during the authentication passage time in step S1300 may include determining whether the authentication passage time is equal to or greater than a predetermined threshold time $t_{MAX}$ in step S1310 and completing authentication of the smart key 200 in step S1320 if the authentication passage time is equal to or greater than the predetermined threshold time $t_{MAX}$.

The authentication passage time may include accumulated passage time of the aforementioned authentication passage time $t_{TOTAL}$. In the embodiment, since the authentication process has been performed N times, the accumulated passage time may be N times $t_{TOTAL}$.

If the authentication process has been normally performed, $t_{TOTAL}$ amounts to $t_{LF}+t_{COMP}+t_{RF}$, and thus the accumulated passage time becomes $N*t_{LF}+N*t_{COMP}+N*t_{RF}$. Otherwise, if the authentication process has been abnormally performed, $t_{TOTAL}$ amounts to $t_{LF}+t_{COMP}+t_{RF}+\alpha$, and thus the accumulated passage time becomes $N*t_{LF}+N*t_{COMP}+N*t_{RF}+N*\alpha$. Accordingly, the threshold time $t_{MAX}$ may be set to $N*t_{LF}+N*t_{COMP}+N*t_{RF}$, and whether the relay attack has occurred may be determined according to the magnitude of $N*\alpha$.

If the authentication passage time is less than the predetermined threshold time $t_{MAX}$, the controller 120 of the vehicle 100 may determine that relay attack has occurred.

While, in the embodiment, after the vehicle 100 transmits information about a code and transmits a test value corresponding to the transmitted code to the smart key 200, the smart key 200 transmits a verification value corresponding to the test value to the vehicle 100, it is also possible for the vehicle 100 to transmit a scanning signal without information about a code and transmit an arbitrary test value to the smart key 200 if receiving a scanning response signal. For this, the smart key 200 may fetch the verification value from the storage 230 corresponding to the test value transmitted from the vehicle 100, and complete the authentication process by transmitting the verification value to the vehicle 100.

Furthermore, if the vehicle 100 transmits information about a code to the smart key 200 with the scanning signal, and receives a scanning response signal from the smart key 200, the vehicle 100 may transmit the authentication request signal without a test value. For this, the smart key 200 may complete the authentication process by transmitting the verification value fetched from the storage 230 corresponding to the code included in the scanning signal with the authentication response signal.

While in the embodiment, the smart key 200 performs the authentication process with the vehicle 100 by receiving the scanning signal and the authentication request signal and transmitting the scanning response signal and the authentication response signal, the authentication process may be performed for a relay involved in performing an abnormal authentication process. In addition to the smart key 200 and the relay, the vehicle 100 may perform the authentication process with various external devices, so the present disclosure is not limited to the aforementioned embodiments.

According to embodiments of the present disclosure, a vehicle and method for controlling the vehicle may estimate delays in signal transmission and reception between a vehicle and a smart key due to an external device attempting abnormal authentication, such as a relay by determining whether the external device is authenticated based on transmission and reception time of LF and RF signals between the vehicle and the external device, thereby preventing hacking.

Furthermore, since it is determined whether a radio signal is hacked based on time required for the vehicle to transmit and receive signals to and from the external device and consistency of mutually shared codes, whether the external device that transmits the RF signal corresponds to an authenticated smart key may be correctly determined.

Several embodiments have been described, but a person of ordinary skill in the art will understand and appreciate that various modifications can be made without departing the scope of the present disclosure. Thus, it will be apparent to those ordinary skilled in the art that the true scope of technical protection is only defined by the following claims. Thus, it will be apparent to those ordinary skilled in the art that the disclosure is not limited to the embodiments described, but can encompass not only the appended claims but the equivalents. For example, an element described in the singular form may be implemented as being distributed, and elements described in a distributed form may be implemented as being combined.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A vehicle comprising:
    a communication unit for transmitting a Low Frequency (LF) signal including a test value to an external device, and for receiving a Radio Frequency (RF) signal including a verification value from the external device;
    a timer for determining a passage time from a point of time of transmission of the test value to a point of time of reception of the verification value;
    a controller for authenticating the external device based on the passage time and whether the test value and the verification value correspond to each other; and
    a storage for storing one or more codes and test values and verification values for the one or more codes, respectively,
    wherein the test value includes a first combination of a plurality of test elements, and the verification value includes a second combination of a plurality of verification elements, and the test value and the verification value are independent from each other,
    wherein the controller authenticates the external device based on whether the plurality of verification elements, corresponding to each test element stored in advance, corresponds to the plurality of verification elements included in the RF signal,
    wherein the controller determines how many times the verification value is received and repeats the transmission of the test value and the reception of the verification value when the number of times the verification value is less than a threshold, and
    wherein the controller stops the timer, which measures a time duration of the transmission of the test value and the reception of the verification value, and stores the time duration in the storage when the number of times the verification value is equal to or greater than the threshold.

2. The vehicle of claim 1, wherein the communication unit transmits the LF signal and receives the RF signal as many times as the threshold.

3. The vehicle of claim 1, wherein the timer determines the passage time from a first point of time of transmission of the test value to a last point of time of reception of the verification value.

4. The vehicle of claim 1, wherein the controller determines that relay attack occurs if the passage time is equal to or greater than a threshold time.

5. The vehicle of claim 1, wherein the communication unit transmits information about a code corresponding to the test value in the LF signal.

6. The vehicle of claim 1, wherein the communication unit comprises:
    an LF communication unit for transmitting a scanning signal to the external device that exists within a possible range of LF signal transmission; and
    an RF communication unit for receiving a scanning response signal from the external device.

7. The vehicle of claim 6, wherein the LF communication unit transmits an authentication request signal including the test value if the RF communication unit receives the scanning response signal, and
    wherein the RF communication unit receives an authentication response signal including the verification value.

8. A method for controlling a vehicle, the method comprising steps of:
    transmitting, by a communication unit, a Low Frequency (LF) signal including a test value to an external device;
    receiving, by the communication unit, a Radio Frequency (RF) signal including a verification value from the external device;
    determining, by a timer, a passage time from a point of time of transmission of the test value to a point of time of reception of the verification value;
    repeating, by a controller, the transmitting of the test value and the reception of the verification value when a number of times the verification value is received is less than a threshold;
    stopping, by the controller, the timer and recording the time detected from the timer in the storage when the number of times the verification has been received is equal to or greater than the threshold; and
    authenticating, by the controller, the external device based on the passage time and whether the test value and the verification value correspond to each other,
    wherein the test value includes a first combination of a plurality of test elements, and the verification value includes a second combination of a plurality of verification elements, and the test value and the verification value are independent from each other, and
    wherein the step of authenticating the external device includes authenticating the external device based on whether the plurality of verification elements, corresponding to each test element stored in advance, correspond to the plurality of verification elements, respectively, included in the RF signal.

9. The method of claim 8, wherein the step of transmitting the LF signal comprises transmitting the LF signal as many times as the threshold, and wherein the step of receiving the RF signal comprises receiving the RF signal as many times as the threshold.

10. The method of claim 9, wherein the step of determining the passage time comprises determining the passage time from a first point of time of transmission of the test value to a last point of time of reception of the verification value.

11. The method of claim 8, wherein the step of authenticating the external device comprises determining that relay attack occurs if the passage time is equal to or greater than a threshold time.

12. The method of claim 8, further comprising, before the step of transmitting the LF signal:

transmitting information about one of one or more codes stored in advance in a scanning signal; and receiving a scanning response signal corresponding to the scanning signal.

13. The method of claim 12, wherein the step of transmitting the LF signal comprises transmitting an authentication request signal including the test value if the scanning response signal is received, and wherein the step of receiving the RF signal comprises receiving an authentication response signal including the verification value.

14. The method of claim 8, wherein the step of authenticating the external device comprises authenticating the external device based on whether the verification value corresponding to the test value stored in advance corresponds to the verification value included in the RF signal.

15. The method of claim 8, wherein the step of transmitting the LF signal comprises starting the timer, and wherein the step of receiving the RF signal comprises stopping the timer.

16. The method of claim 8, wherein the step of authenticating the external device comprises determining that relay attack occurs if the test value does not correspond to the verification value.

\* \* \* \* \*